United States Patent
Abdelhadi et al.

(10) Patent No.: US 9,178,960 B2
(45) Date of Patent: Nov. 3, 2015

(54) RECOVERING RESOURCE CONNECTIONS

(75) Inventors: Sanaa F. Abdelhadi, Richardson, TX (US); Sandip A. Amin, Austin, TX (US); Jennifer Lee Carlucci, Mission Viejo, CA (US); David Wa-Wai Nip, Hopewell Junction, NY (US); Danling Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1289 days.

(21) Appl. No.: 11/936,285

(22) Filed: Nov. 7, 2007

(65) Prior Publication Data

US 2009/0119682 A1     May 7, 2009

(51) Int. Cl.
*G06F 3/00* (2006.01)
*G06F 9/44* (2006.01)
*G06F 9/46* (2006.01)
*G06F 13/00* (2006.01)
*H04L 29/08* (2006.01)
*H04L 29/14* (2006.01)

(52) U.S. Cl.
CPC .............. *H04L 67/306* (2013.01); *H04L 67/14* (2013.01); *H04L 67/145* (2013.01); *H04L 69/40* (2013.01)

(58) Field of Classification Search
None
See application file for complete search history.

(56) References Cited

U.S. PATENT DOCUMENTS

| | | | |
|---|---|---|---|
| 6,779,004 B1 * | 8/2004 | Zintel | 709/227 |
| 6,792,426 B2 | 9/2004 | Baumeister et al. | |
| 6,829,575 B2 | 12/2004 | Freund et al. | |
| 6,862,690 B1 * | 3/2005 | Bezera et al. | 714/4 |
| 2003/0093575 A1 * | 5/2003 | Upton | 709/310 |
| 2007/0203944 A1 | 8/2007 | Batra et al. | |

FOREIGN PATENT DOCUMENTS

JP     2007038826 A     2/2007

* cited by examiner

*Primary Examiner* — Craig Dorais
(74) *Attorney, Agent, or Firm* — Yee & Associates, P.C.; Damion Josephs

(57) ABSTRACT

Illustrative embodiments provide a computer implemented method, data processing system, and computer program product for recovering resource connections using persistent subscriptions. In one illustrative embodiment, the method comprises subscribing to an event of a predefined resource to create a persistent subscription, wherein upon receiving notification of the event indicating the predefined resource is unavailable, and responsive to receiving the notification, reconnecting to the predefined resource. The method further comprises creating a new listener for receiving event notifications from the predefined resource, obtaining subscription information related to the predefined resource from the persistent subscription, and re-subscribing to the event of the predefined resource.

20 Claims, 4 Drawing Sheets

RECOVERING RESOURCE CONNECTIONS

BACKGROUND OF THE INVENTION

1. Field of the Invention

The present invention relates generally to an improved data processing system and in particular to a computer implemented method, data processing system and computer program product for recovering resource connections.

2. Description of the Related Art

Enterprise application integration has grown significantly establishing a need to ease the effort required to couple disparate systems together. Industry standards such as Java™ 2 Platform Enterprise Edition Connector Architecture (JCA) have been developed under the Java community process by a group of technology firms to address such needs. Java™ 2 Platform Enterprise Edition or Java EE, as it is now referred, is a set of technologies that enable solutions for the development and deployment, as well as the management of multi-tier, server-centric applications. Java EE adds capabilities to provide a stable, secure, and fast Java platform for enterprise use to reduce the cost and complexity of developing and deploying solutions. The specification for the architecture may be obtained through the Sun Microsystems developer web site. Implementations of the specification may be obtained from various vendors including Sun™, HP™ and IBM®. Java 2 Platform Enterprise Edition Connector Architecture provides a fairly generic way to connect legacy systems with application servers as part of an enterprise application integration solution. Typical solutions are established in a three tier manner comprising a client, a Java 2 Platform Enterprise Edition Connector Architecture application server, and an enterprise information server.

Implementations of Java 2 Platform Enterprise Edition Connector Architecture provide a mechanism to store and retrieve data belonging to an enterprise with the Java 2 Platform Enterprise Edition Connector Architecture environment. The use of Java 2 Platform Enterprise Edition Connector Architecture provides adapters for enterprise connectivity. The use of Java 2 Platform Enterprise Edition Connector Architecture adapters is similar to the use of Java Database Driver Connectivity (JDBC) to connect to and access a database.

Within the scope of the Java 2 Platform Enterprise Edition Connector Architecture is a resource adapter. The resource adapter is specific to an enterprise information system in a manner similar to that of the database connectivity drivers. A resource adapter specific to the resource with which a connection is desired must be available. The resource adapter comes in combination with connectivity management. Connectivity management handles the establishment, pooling, and tear down of connections. Connection management also allows listeners created on a connection to respond to events, particularly when the connection becomes lost or suffers errors. For example, when a network connection is lost, a connection manager may provide a dialog to inform the user of the lost connection and provide an opportunity to re-connect with the network or the application. In another example, an application connection may not be responding and the connection manager may alert the user of the application problem.

Resources of the enterprise information server may be subscribed to by other components or applications. In cases where the connection has been lost, and the resource later becomes available, the subscription has to be restored through subscribing. A subscription may be lost due to a dropped connection to a Java 2 Platform Enterprise Edition Connector Architecture container, such as an application server or an enterprise information server. The subscription information is typically stored in volatile memory, which is lost whenever the server encounters trouble and has to shut down. On restart of the server, the subscriptions must be initialized again by the respective user having the subscription.

SUMMARY OF THE INVENTION

Illustrative embodiments provide a computer implemented method, data processing system, and computer program product for recovering resource connections.

The computer implemented method comprises subscribing to an event of a predefined resource to create a persistent subscription, receiving notification of the event indicating the predefined resource is unavailable, and responsive to receiving the notification reconnecting to the predefined resource. The computer implemented method further comprises creating a new listener for receiving event notifications from the predefined resource, obtaining subscription information related to the predefined resource from the persistent subscription, and re-subscribing to the event of the predefined resource.

The data processing system comprises a first subscriber capable of subscribing to an event of a predefined resource to create a persistent subscription, a receiver capable of receiving notification of the event indicating the predefined resource is unavailable, a connector capable of reconnecting to the predefined resource, responsive to receiving the notification, a generator capable of creating a new listener for receiving event notifications from the predefined resource, a finder capable of obtaining subscription information related to the predefined resource from the persistent subscription, and a second subscriber capable of re-subscribing to the event of the predefined resource.

The computer program product comprises computer executable program code tangibly embodied on a computer usable recordable type medium. The computer executable program code comprises computer executable program code for subscribing to an event of a predefined resource to create a persistent subscription and computer executable program code for receiving notification of the event, indicating the predefined resource is unavailable. Further there is computer executable program code responsive to receiving the notification for reconnecting to the predefined resource, and computer executable program code for creating a new listener for receiving event notifications from the predefined resource. In addition there is computer executable program code for obtaining subscription information related to the predefined resource from the persistent subscription, and computer executable program code for re-subscribing to the event of the predefined resource.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
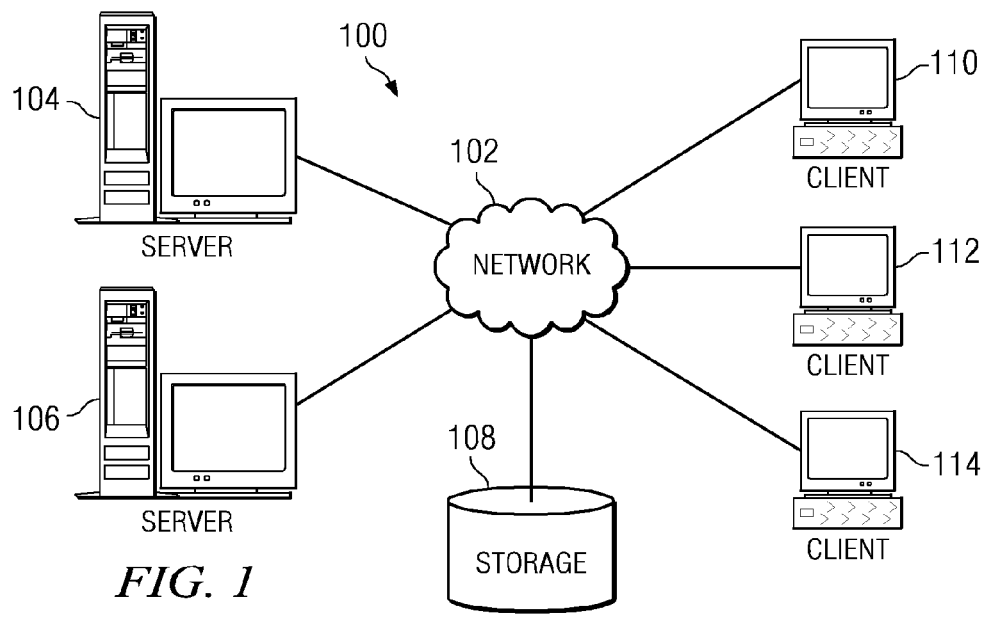
FIG. 1 is a pictorial representation of a network of data processing systems in which illustrative embodiments may be implemented.
Figure 2:
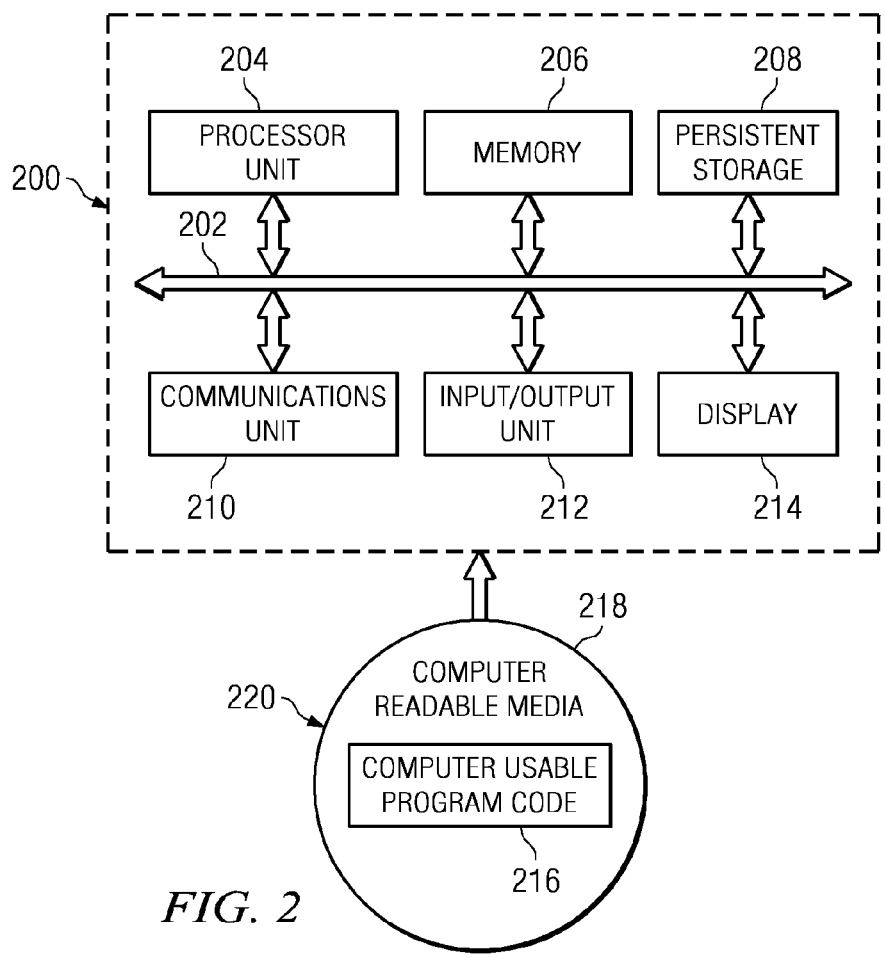
FIG. 2 is a block diagram of a data processing system of FIG. 1 in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Illustrative embodiments may be used to better manage connections among clients and servers and related applications. For example, in the event of a dropped connection between client 110 and an application on a server 106 of FIG. 1, persistent resource information specific to the connection may be used to re-establish the connection typically minimizing user intervention and reducing down time for the connected resources.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
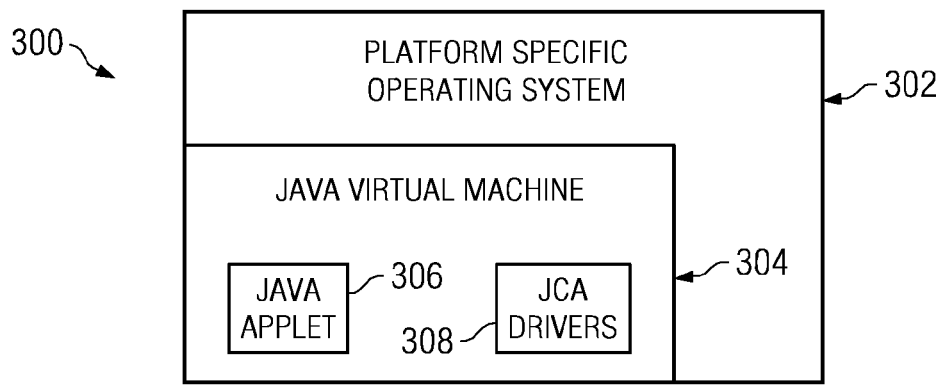
FIG. 3 is a block diagram of a related software components within a data processing system of FIG. 2, in accordance with illustrative embodiments.

With reference now to FIG. 3, a block diagram of related software components within a computer system, in accordance with illustrative embodiments is shown. Java system 300 contains platform specific operating system 302 that provides hardware and system support to software executing on a specific hardware platform. Java virtual machine (JVM) 304 is one software application that may execute in conjunction with the operating system. Java virtual machine 304 provides a Java run-time environment with the ability to execute Java application or Java applet 306, which is a program, servlet, or software component written in the Java programming language. The computer system in which Java virtual machine 304 operates may be similar to data processing system 200 or any of client 110 or server 104 described above. However, Java virtual machine 304 may be implemented in dedicated hardware on a so-called Java chip, Java-on-silicon, or Java processor with an embedded picoJava core.

At the center of a Java run-time environment is the Java virtual machine, which supports all aspects of Java's environment, including its architecture, security features, and mobility across networks, and platform independence.

The Java virtual machine is a virtual computer, for example, a computer that is specified abstractly. The specification defines certain features that every Java virtual machine must implement, with some range of design choices that may depend upon the platform on which the Java virtual machine is designed to execute. For example, all Java virtual machines must execute Java bytecodes and may use a range of techniques to execute the instructions represented by the bytecodes. A Java virtual machine may be implemented completely in software or somewhat in hardware. This flexibility allows different Java virtual machines to be designed for mainframe computers and personal digital assistants.

The Java virtual machine is the name of a virtual computer component that actually executes Java programs. Java programs are not run directly by the central processor, but instead by the Java virtual machine, which is itself a piece of software running on the processor. The Java virtual machine allows Java programs to be executed on a different platform as opposed to only the one platform for which the code was compiled. Java programs are compiled for the Java virtual machine. In this manner, Java is able to support applications for many types of data processing systems, which may contain a variety of central processing units and operating system architectures.

To enable Java applet 306 to execute on different types of data processing systems, a compiler typically generates an architecture-neutral file format. This compiled code is executable on many processors, given the presence of the Java run-time system. The Java compiler generates bytecode instructions that are nonspecific to a particular computer architecture. A bytecode is a machine independent code generated by the Java compiler and executed by a Java interpreter. A Java interpreter is part of the Java virtual machine that alternately decodes and interprets a bytecode or bytecodes. These bytecode instructions are designed to be easy to interpret on any computer and easily translated on the fly into native machine code. Byte codes may be translated into native code by a just-in-time (JIT) compiler.

Java virtual machine 304 further comprises Java application programming interfaces (APIs) for generic connectivity to legacy systems, and industry standard Java 2 Platform Enterprise Edition connector architecture JCA drivers such as JCA drivers 308, hereafter drivers 308, which are needed by the application. For example, the generic connectivity interfaces of drivers 308 are provided to enable cross platform connectivity in a manner similar to the database connectivity support provided in the form of industry standard Java database connectivity (JDBC) drivers available from a number of database product vendors such as IBM and Oracle™.

Illustrative embodiments use the generic connectivity to legacy systems provided in the form of Java 2 Platform Enterprise Edition connector architecture software. Other suitable connectivity drivers may be used that are less generic and more proprietary as required by the implementation or product offering. The connector architecture enables development of generic connectors, also known as resource adapters, to access enterprise information systems, such as legacy systems that typically include transaction processing systems, as well as database systems.

Illustrative embodiments provide a collection of services and resources to define and describe attributes of connections between resources, such as, a connection between a client and an application running on a server. In the event an established connection is dropped, use of the illustrative embodiment's services and resources typically enables the recovery, or restoration, of the connection while minimizing user involvement and downtime.

Figure 4:
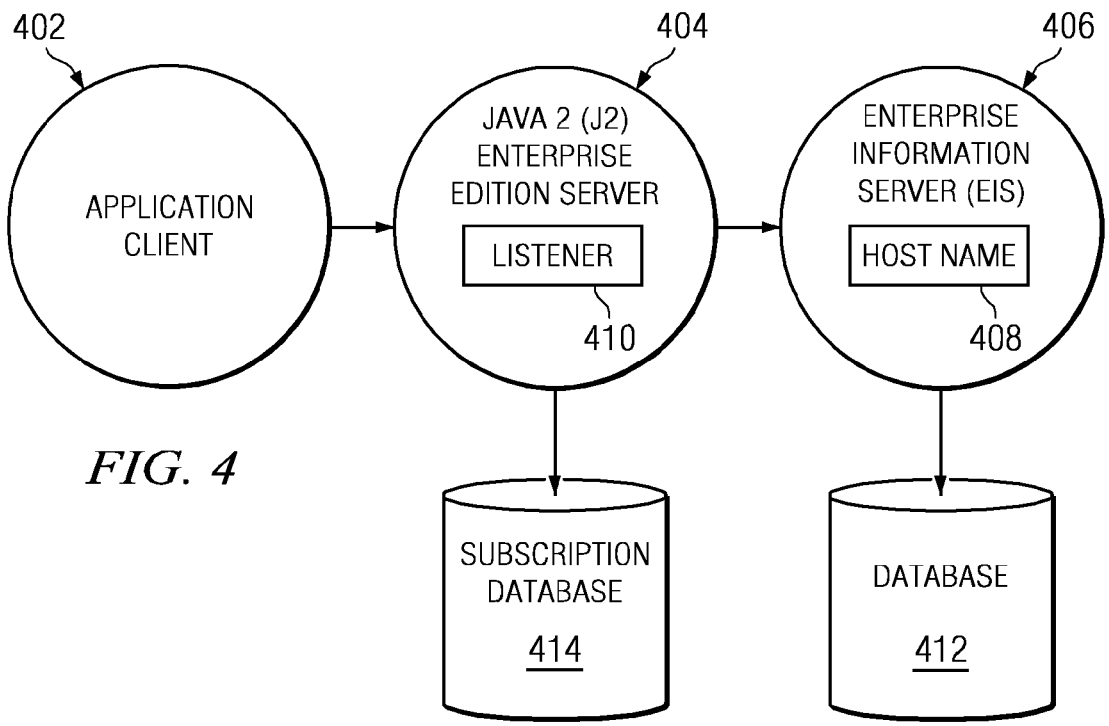
FIG. 4 is a block diagram of a network of data processing system for managing connections in accordance with illustrative embodiments.

With reference now to FIG. 4, a block diagram of a network of data processing systems for managing connections in accordance with illustrative embodiments is shown. Application client 402, Java 2 Enterprise Edition server 404 and enterprise information server (EIS) 406 may be instances of client 110, server 104 and server 106, respectively, of FIG. 1.

Application client 402 typically requests services and information, during the course of an application session, from either Java 2 Enterprise Edition server 404 or enterprise information server (EIS) 406 or both. Application client 402 typically executes light weight application code or "applets" while Java 2 Enterprise Edition server 404 executes the more complex application processing.

Java 2 Enterprise Edition server 404 typically provides support to application client 402 in the form of web and business related functions. These functions are typically more complex than those that would operate on application client 402, thereby offloading the clients of this form of processing onto the more robust and secure server. A listener 410 is typically created on a Java 2 Enterprise Edition server 404 to monitor event information related to enterprise information server 406.

Java 2 Enterprise Edition server 404 stores connection and subscription related information in attached subscription database 414. The subscription information is stored, within subscription database 414 using container managed persistent entity beans as known in the Java environment.

An entity bean is used to represents a business object in persistent storage. For example, an entity bean may represent customers, orders, communication connections and products. Container-managed persistence means that the enterprise Java bean container handles all database access required by the entity bean. The bean's code contains no database access, such as structured query language (SQL) calls. As a result, the bean's code is flexible with regard to underlying implementations of storage systems and not implemented to a specific persistent storage mechanism such as a database. The flexibility allows deployment of the entity bean across different J2EE servers that use different databases, without a need to modify or recompile the bean's code, thereby making the entity bean more portable.

Subscription information typically contains properties or attributes defining the subscription. The definitions for subscribed connections typically include hostnames being connected, connector or adapter usage, name of listener to be created, location of listener, and authentication attribute and values necessary to establish a connection on the target systems.

Enterprise information server 406 typically comprises database management systems including database 412, transaction based systems or other legacy based systems resources that are of interest to application client 402. Application client 402 typically uses the services and interfaces provided by Java 2 Enterprise Edition server 404 to access resource information contained on enterprise edition server 406. Enterprise information server 406 provides an information hosting service for clients. Each enterprise information server 406 has a unique hostname 408 within the network to allow easy reference. Enterprise information server 406 will send event notifications to all subscribed listeners, wherein events typically include system failure and restart activity related to the server or perhaps an update to a database table through a database management system.

Connection information specific to currently active connections, in particular those between Enterprise information server 406 and Java 2 Enterprise Edition server 404, are maintained within the local memory of the respective systems. Whenever a connection is lost, for whatever reason between the two servers, the connection information in the memory becomes stale and must be refreshed. Connection information typically includes entries describing the location, type of resource and users of the resource, such as the listeners.

Currently, for example, if application client 402 had requested database 412 information contained on enterprise information server 406 through Java 2 Enterprise Edition server 404 a connection would have been created using drivers 308 of FIG. 3. Drivers 308 would perform the connection management including the event notification by initiating a listener 410 on Java 2 Enterprise Edition server 404, subscribing to receive event notification related to failures of enterprise information server 406. Java 2 Enterprise Edition server 404 needs to know the service and resource availability of enterprise information server 406 and having listener 410 will allow the server to know whenever the resource, such as, enterprise information server 406 or database 412 becomes unavailable.

As a result of a failure of enterprise information server 406, all connection information in the local memory is lost. Java 2 Enterprise Edition server 404 receives notification of the failure, if there was time to send a notice, or the server presumes enterprise information server 406 has failed due to the lack of communication acknowledgements. Java 2 Enterprise Edition server 404 requests application client 402 to resubmit the earlier request, thereby creating a new connection to enterprise information server 406 and a corresponding subscription as a listener.

Figure 5:
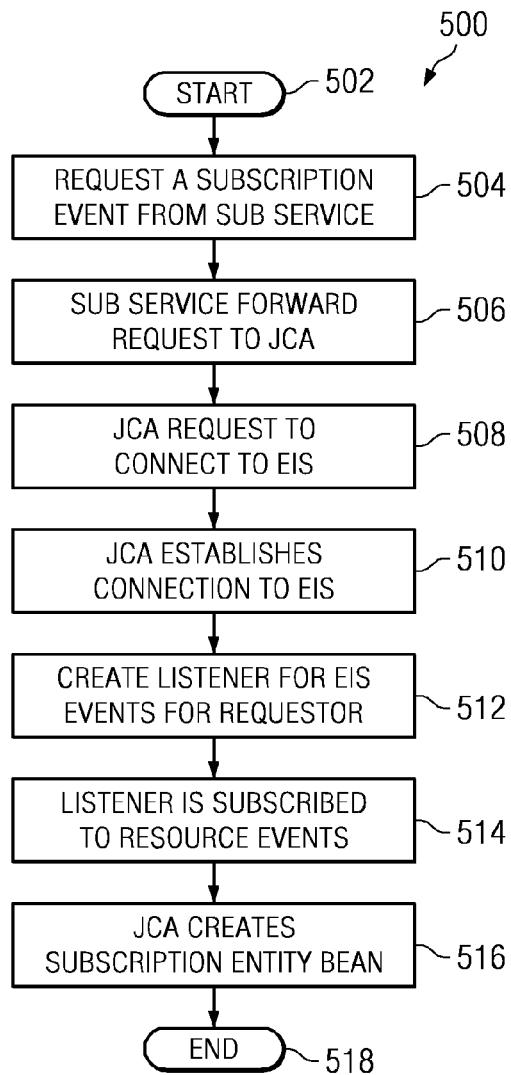
FIG. 5 is a flowchart of a high level process of managing connections in accordance with illustrative embodiments.

With reference to FIG. 5 a flowchart of a high level process of managing connections in accordance with illustrative embodiments is shown. Process 500, of a combination of Java 2 Enterprise Edition server 404 in FIG. 4 and drivers 308 in FIG. 3, provides enhanced connection management including subscriptions, such as those used in event listening scenarios. In particular, process 500 provides a capability for re-establishing subscription information without requesting a user to repeat previously issued requests, after connections have been lost, through the use of Java 2 Enterprise Edition server 404 components of subscription services with subscription database 414, and drivers 308 of FIG. 3.

Process 500 starts at step 502, and receives a request for an event subscription from a subscription service (step 504). A subscription service is provided by a resource manager of the Java 2 Enterprise Edition server 404 in FIG. 4. The subscription service forwards the subscription request to a subscription management component of drivers 308 of FIG. 3 (step 506). Subscription management typically includes a function of a first subscriber capable of subscribing to an event of a predefined resource to create a persistent subscription and a second subscriber capable of re-subscribing to the event of the predefined resource after an outage of the resource server. First and second subscribers may be the same service performing the same function at different times.

Drivers 308 requests a connection to be created with the managed resources of enterprise information server 406 (step 508). Drivers 308, contacts enterprise information server 406, and establishes a connection between enterprise information server 406 and Java 2 Enterprise Edition server 404 (step 510). The resource adapters of drivers 308 typically provide the specific capability to establish connections between the desired server and resource. For example, a connector may be provided to access a specific spreadsheet format over a network protocol; in another example a connector specific to a legacy transaction processing system may be provided. Connectors may be provided as selectable elements as opposed to generic adapters. Connection and subscription information is maintained in the subscription database 414.

Having established a connection, a listener is created on Java 2 Enterprise Edition server 404 (step 512). The listener is created to listen for predefined events that occur on enterprise information server 406. A generator capable of creating a new listener for receiving event notifications from the predefined resource is used to create the listeners. Generators for creating listeners are typically found in message based systems, such as Java Message System. Events of interest are typically those events that affect the availability of data needed by the requester.

For example, the loss of a database management system, transaction processor or server would prevent a requested resource from responding to a user request for data and would meet the criteria for an event of interest to a listener. In this example, a listener such as listener 410 is created by a message service such as such as Java Message System on Java 2 Enterprise Edition server 404 for events related to enterprise information server 406 of FIG. 4. The listener is actually a receiver capable of receiving notification of the event indicating the predefined resource is unavailable. Such listeners are common within the messaging systems and event based processing systems.

A subscription is created by subscription services component of Java 2 Enterprise Edition server 404 based on a connection between Java 2 Enterprise Edition server 404 and enterprise information server 406 (step 514). The subscription provides a message notifying a listener of a predefined type of event related to a specified resource occurring on a managed resource, such as enterprise information server 406.

The subscription information created in step 514 is managed using an entity bean of the subscription services component of Java 2 Enterprise Edition server 404 (step 516), with process 500 terminating thereafter (step 518). A finder, capable of locating and requesting the content of the entity bean, may be implemented as a typical database query. The database query is directed to select the entity bean, from within the subscription database 414 where the entity bean content was stored, and request the contents of the entity bean.

Content of the entity bean may be filtered using selective criteria of the database query to reduce the data returned. Use of the entity bean takes advantage of characteristics of the entity bean to enable the persistence of the information, comprising details of the subscription, in an accessible storage location. Prior to using entity beans, when a connection was lost, any information regarding the connection and associated subscription was also lost. With the advent of entity bean usage, the loss of connection and subscription information may be avoided, as described next.

Figure 6:
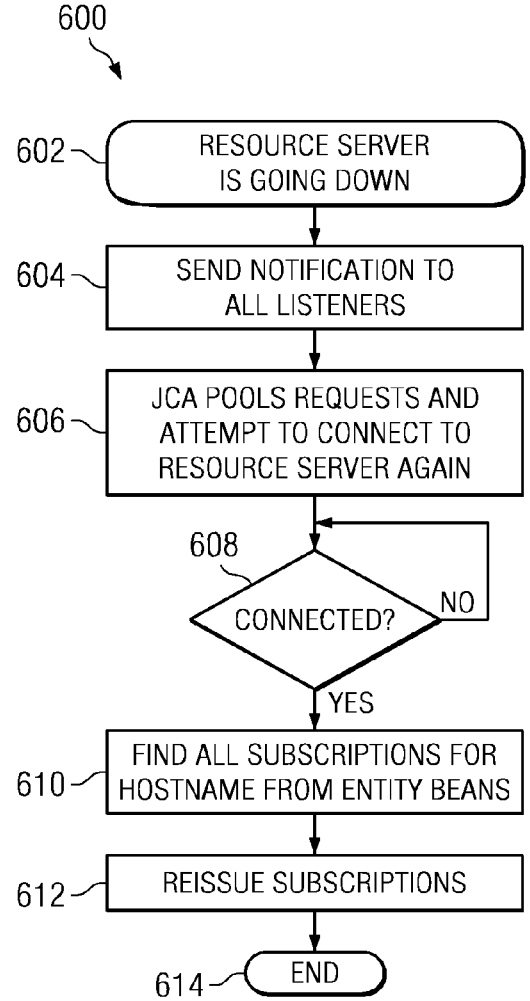
FIG. 6 is a flowchart of managing connections from an enterprise information system server perspective in accordance with illustrative embodiments.

With reference to FIG. 6, a flowchart of managing connections during a restart from an enterprise information system server perspective, in accordance with illustrative embodiments is shown. In the following example, enterprise information server 406 of FIG. 4 fails and subscriptions are recovered. Process 600, a recovery process supported by the subscription services component of Java 2 Enterprise Edition server 404 in combination with drivers 308, starts with an event in which it is known that enterprise information server 406 is going down due to some failure (step 602). Enterprise information server 406 issues notification of the impending outage to all subscribed listeners by a broadcast message or other means of directing messages as is known in the art (step 604). Drivers 308 of FIG. 3, receives a notification including the hostname of the server involved in the event, because the drivers were one of the identified listeners. The drivers then create a task, or thread, to pool requests destined for the failing server and attempt to reconnect and reestablish a login session with the resource server, enterprise information server 406 (step 606).

Drivers 308 attempts to reconnect Java 2 Enterprise Edition server 404 with enterprise information server 406, with each attempt analyzed to determine if a connection has been achieved (step 608). If a connection has not been re-established, providing a "no" in step 608, process 600 iterates within step 608. If a connection was successfully re-established, providing a "yes" in step 608 drivers 308 creates a new listener for receiving events from the restarted resource server, enterprise information server 406. Drivers 308 connects to the subscription entity bean to retrieve all subscriptions associated with the hostname of the failing server, such as enterprise information server 406, located within the contents of the particular subscription entity bean (step 610).

For each subscription found related to the identified hostname, the subscription is renewed to that hostname by drivers 308 without user intervention (step 612), and process 600 terminates thereafter (step 614).

Figure 7:
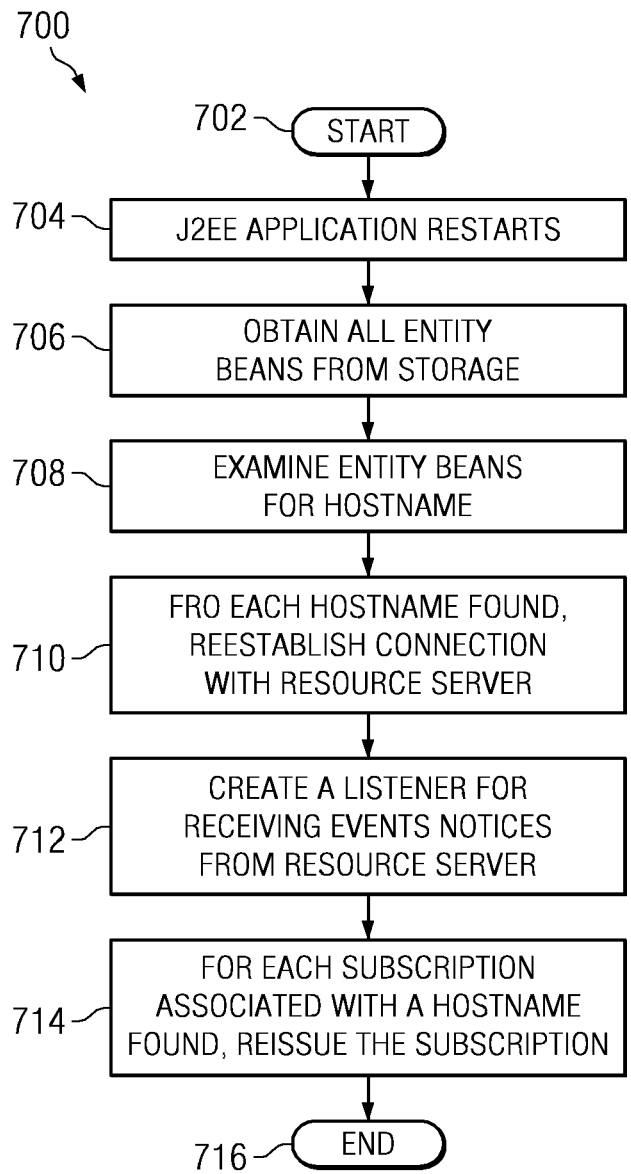
FIG. 7 is a flowchart of managing connections from a Java 2 enterprise edition server perspective in accordance with illustrative embodiments.

With reference to FIG. 7, a flowchart of managing connections during a restart of a Java 2 Enterprise Edition server from a Java 2 enterprise edition server perspective, process 700, in accordance with illustrative embodiments is shown.

Process 700, of the subscription services of Java 2 Enterprise Edition server, starts at step 702 with the assumption that the Java 2 Enterprise Edition server has gone down. The Java 2 Enterprise Edition server is restarted (step 704). The restarting of the server initiates a search of the subscription database for all existing subscription entity beans related to the previously failed server and its associated connections (step 706). The search for the entity beans typically requires the submission of a database request or query to retrieve the needed subscription entity bean information resources from the database in which the subscription entity beans had been persisted.

Having found one or more subscription entity beans, each is queried for a relevant hostname contained within the descriptive information of the subscription entity bean (step 708). For each hostname found in the subscription entity beans, defined connections to the servers associated with the respective hostnames are reestablished (step 710). A listener, on the Java 2 Enterprise Edition server, capable of receiving event notices from the resource servers identified by the located hostnames is then recreated (step 712).

For every subscription, associated with a just reconnected hostname, a subscribe request is reissued to restore the subscription as it was before the failure occurred (step 714). Process 700 terminates thereafter (step 716).

Illustrative embodiments provide a capability to typically restore a dropped connection between resources using persisted subscription information. This capability minimizes the user intervention required to restore communications over previously active communication links. Persisted subscription information is maintained across an outage in contrast to the loss of local memory copies of connection information in prior conventional implementations. Further, in other embodiments, the persisted subscription information may also be queried for other purposes, such as, connectivity usage and reporting. Other feature or benefits, not mentioned, also may be present or occur in other embodiments in addition to or in place of the ones described.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable type medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a transmission medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for recovering resource connections, the computer implemented method comprising:
    subscribing to an event of a predefined resource on an application server associated with a managed runtime platform by a first subscriber to create a persistent subscription, using an entity bean having container-managed persistence, wherein the persistent subscription, including connection information, is stored on a a server of a managed runtime, implementing connection pooling using a set of resource adapters for connectivity with the server of the managed runtime platform, and wherein the subscribing creates on the server of the managed runtime platform a first listener for the event to monitor event information related to the application server;
    receiving, at the first listener, a first notification of the event of an outage associated with the predefined resource indicating the predefined resource on the Enterprise Information Server is unavailable, wherein the first notification including information comprising a hostname associated with the predefined resource involved in the event;
    receiving a second notification of the server of the managed runtime platform reconnecting to the predefined resource, wherein the predefined resource on the application server is available;
    after receiving the second notification, obtaining subscription information related to the predefined resource from the persistent subscription using the entity bean;
    creating, on the server of the managed runtime platform, a new listener to monitor event information related to the predefined resource on the Enterprise Information Server, now available, for receiving new event notifications from the predefined resource, wherein the new listener is capable of receiving event notices from a resource server identified by the hostname; and
    re-subscribing to the event of the predefined resource associated with the hostname, by a second subscriber using the subscription information obtained after the outage associated with the predefined resource, without requesting a user to repeat previously issued requests, wherein the first subscriber and the second subscriber are one of a same service performing a same function at different times.

2. The computer implemented method of claim 1 wherein subscribing to an event of a predefined resource to create a persistent subscription further comprises:
    receiving a request to subscribe to a resource specific event;
    wherein the first listener is configured to accept a notification of the resource specific event; and
    storing subscription information defining a connection with the predefined resource using the entity bean.

3. The computer implemented method of claim 1 wherein the first notification includes information comprising a hostname of the predefined resource associated with a predefined type of event related to the predefined resource occurring on a managed resource.

4. The computer implemented method of claim 1 wherein reconnecting to the predefined resource further comprises:
    pooling of connections to obtain a login session for the predefined resource;
    responsive to successfully logging in to the predefined resource, establishing a login session; and
    responsive to unsuccessfully logging in to the predefined resource, waiting a predetermined time and attempting to log in to the predefined resource.

5. The computer implemented method of claim 1 wherein subscribing to an event of a predefined resource to create a persistent subscription further comprises:
    creating an entity bean defining subscription information for one or more subscriptions related to the predefined resource, wherein the subscription information contains information comprising properties or attributes defining a particular subscription, definitions for subscribed connections including hostnames being connected, connector or adapter usage, name of listener to be created, location of listener, and authentication attribute and values necessary to establish a connection on a target system.

6. The computer implemented method of claim 5 wherein the entity bean is stored in a database entry, and wherein an enterprise bean container handles all database access required by the entity bean.

7. The computer implemented method of claim 6 wherein obtaining subscription information related to the predefined resource from the persistent subscription further comprises:
creating a database query for subscription information of the predefined resource; and
executing the database query to retrieve the subscription information from the database entry, wherein the database query is directed to select the entity bean, from within the database entry of a subscription database where the entity bean was stored, and request contents of the entity bean, and wherein content of the entity bean is filtered using selective criteria of the database query to reduce data returned.

8. A data processing system for recovering resource connections, the data processing system comprising:
a bus,
a memory connected to the bus;
a storage device connected to the bus, wherein the storage device contains computer usable code;
a communications unit connected to the bus; and
a processing unit connected to the bus, wherein the processing unit executes the computer usable code to provide:
a first subscriber capable of subscribing to an event of a predefined resource on an application server associated with a managed runtime platform to create a persistent subscription, using an entity bean having container-managed persistence, wherein the persistent subscription including connection information is stored on a server of a managed runtime, implementing connection pooling using a set of resource adapters for connectivity with the server of the managed runtime platform, and wherein the subscribing creates on the server of the managed runtime platform, a first listener for the event to monitor event information related to the application server;
a receiver capable of receiving, at the first listener, a first notification of the event of an outage associated with the predefined resource indicating the predefined resource on the application server is unavailable, wherein the first notification including information comprising a hostname associated with the predefined resource involved in the event;
a connector capable of reconnecting to the predefined resource responsive to receiving a second notification of the server of the managed runtime platform, wherein the predefined resource on the application server is available;
a finder capable of, after receiving the second notification, obtaining subscription information related to the predefined resource from the persistent subscription using the entity bean;
a generator capable of creating, on the server of the managed runtime platform, a new listener to monitor event information related to the predefined resource on the application server, now available, for receiving new event notifications from the predefined resource, wherein the new listener is capable of receiving event notices from a resource server identified by the hostname; and
a second subscriber capable of re-subscribing to the event of the predefined resource associated with the hostname, by a second subscriber using the subscription information obtained after the outage associated with the predefined resource, without requesting a user to repeat previously issued requests, wherein the first subscriber and the second subscriber are one of a same service performing a same function at different times.

9. The data processing system of claim 8 wherein the first subscriber further comprises a capability for:
receiving a request to subscribe to a resource specific event; wherein the first listener is configured to accept a notification of the resource specific event; and
storing subscription information defining a connection with the predefined resource using the entity bean.

10. The data processing system of claim 8 wherein the receiver capable of receiving the first notification further comprises:
a capability for receiving information comprising a hostname of the predefined resource associated with a predefined type of event related to the predefined resource occurring on a managed resource.

11. The data processing system of claim 8 wherein the connector further comprises a capability for:
pooling of connections to obtain a login session for the predefined resource;
responsive to successfully logging in to the predefined resource, establishing a login session; and
responsive to unsuccessfully logging in to the predefined resource, waiting a predetermined time and attempting to log in to the predefined resource.

12. The data processing system of claim 8 wherein the first subscriber further comprises a capability of creating an entity bean defining subscription information for one or more subscriptions related to the predefined resource, wherein the subscription information contains information comprising properties or attributes defining a particular subscription, definitions for subscribed connections including hostnames being connected, connector or adapter usage, name of listener to be created, location of listener, and authentication attribute and values necessary to establish a connection on a target system.

13. The data processing system of claim 12 wherein the entity bean is stored in a database entry, and wherein an enterprise bean container handles all database access required by the entity bean.

14. The data processing system of claim 13 wherein the finder further comprises a capability for obtaining subscription information related to the predefined resource from the persistent subscription further comprising:
creating a database query for subscription information of the predefined resource; and
executing the database query to retrieve the subscription information from the database entry, wherein the database query is directed to select the entity bean, from within the database entry of a subscription database where the entity bean was stored, and request contents of the entity bean, and wherein content of the entity bean is filtered using selective criteria of the database query to reduce data returned.

15. A computer program product for recovering resource connections, the computer program product comprising computer executable program code stored on a non-transitory computer usable recordable type medium, the computer executable program code comprising:
computer executable program code for subscribing to an event of a predefined resource on an application server associated with a managed runtime platform by a first subscriber to create a persistent subscription, using an entity bean having container-managed persistence, wherein the persistent subscription including connection information is stored on a server of a managed runtime, implementing connection pooling using a set of resource adapters for connectivity with the server of the managed runtime platform, and wherein the subscribing creates on the server of the managed runtime platform, a first listener for the event to monitor event information related to the application server;

computer executable program code for receiving, at the first listener, a first notification of the event of an outage associated with the predefined resource indicating the predefined resource on the application server is unavailable, wherein the first notification including information comprising a hostname associated with the predefined resource involved in the event;

computer executable program code for receiving a second notification of the server of the managed runtime platform, reconnecting to the predefined resource, wherein the predefined resource on the application server is available;

computer executable program code for, after receiving the second notification, obtaining subscription information related to the predefined resource from the persistent subscription using the entity bean;

computer executable program code for creating, on the server of the managed runtime platform, a new listener to monitor event information related to the predefined resource on the application server, now available, for receiving new event notifications from the predefined resource, wherein the new listener is capable of receiving event notices from a resource server identified by the hostname; and computer executable program code for re-subscribing to the event of the predefined resource associated with the hostname, by a second subscriber using the subscription information obtained, after the outage associated with the predefined resource, without requesting a user to repeat previously issued requests, wherein the first subscriber and the second subscriber are one of a same service performing a same function at different times.

16. The computer program product of claim 15 wherein the computer executable program code for subscribing further comprises computer executable program code for:
receiving a request to subscribe to a resource specific event;
wherein the first listener is configured to accept a notification of the resource specific event; and
storing subscription information defining a connection with the predefined resource using the entity bean.

17. The computer program product of claim 15 wherein the computer executable program code for receiving the first notification further comprises computer executable program code for receiving information comprising a hostname of the predefined resource associated with a predefined type of event related to the predefined resource occurring on a managed resource.

18. The computer program product of claim 15 wherein the computer executable program code for reconnecting further comprises computer executable program code for:
pooling of connections to obtain a login session for the predefined resource;
responsive to successfully logging in to the predefined resource, establishing a login session; and
responsive to unsuccessfully logging in to the predefined resource, waiting a predetermined time and attempting to log in to the predefined resource.

19. The computer program product of claim 15 wherein the computer executable program code for subscribing further comprises computer executable program code for creating an entity bean defining subscription information for one or more subscriptions related to the predefined resource, wherein the subscription information contains information comprising properties or attributes defining a particular subscription, definitions for subscribed connections including hostnames being connected, connector or adapter usage, name of listener to be created, location of listener, and authentication attribute and values necessary to establish a connection on a target system and storing the entity bean in a database entry, and wherein an enterprise bean container handles all database access required by the entity bean.

20. The computer program product of claim 19 wherein the computer executable program code for obtaining subscription information further comprises computer executable program code for creating a database query for subscription information of the predefined resource; and
executing the database query to retrieve the subscription information from the database entry, wherein the database query is directed to select the entity bean, from within the database entry of a subscription database where the entity bean was stored, and request contents of the entity bean, and wherein content of the entity bean is filtered using selective criteria of the database query to reduce data returned.

* * * * *